US010950423B2

(12) United States Patent
Ikegami et al.

(10) Patent No.: US 10,950,423 B2
(45) Date of Patent: Mar. 16, 2021

(54) IMAGING MASS SPECTROMETRY DATA PROCESSING DEVICE AND IMAGING MASS SPECTROMETRY DATA PROCESSING METHOD

(71) Applicant: SHIMADZU CORPORATION, Kyoto (JP)

(72) Inventors: Masahiro Ikegami, Kyoto (JP); Koretsugu Ogata, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 16/328,122

(22) PCT Filed: Aug. 26, 2016

(86) PCT No.: PCT/JP2016/075094

§ 371 (c)(1),
(2) Date: Feb. 25, 2019

(87) PCT Pub. No.: WO2018/037569

PCT Pub. Date: Mar. 1, 2018

(65) Prior Publication Data

US 2019/0189414 A1 Jun. 20, 2019

(51) Int. Cl.
*H01J 49/00* (2006.01)
*H01J 49/02* (2006.01)
*G01N 27/62* (2021.01)

(52) U.S. Cl.
CPC ............ *H01J 49/027* (2013.01); *G01N 27/62* (2013.01); *H01J 49/004* (2013.01); *H01J 49/0004* (2013.01); *H01J 49/0036* (2013.01)

(58) Field of Classification Search
USPC .......................................................... 250/282
See application file for complete search history.

(56) References Cited

U.S. PATENT DOCUMENTS 4,760,331 A * 7/1988 Komuro .................... G01D 7/08
324/121 R
8,324,569 B2 * 12/2012 Kajihara ............. H01J 49/0004
250/281

(Continued)

FOREIGN PATENT DOCUMENTS

CN 104112643 A 10/2014
CN 105190303 A 12/2015

(Continued)

OTHER PUBLICATIONS

Communication dated Jul. 5, 2019, from the European Patent Office in counterpart European Application No. 16914243.7.

(Continued)

*Primary Examiner* — Phillip A Johnston
(74) *Attorney, Agent, or Firm* — Sughrue Mion, PLLC

(57) ABSTRACT

The user specifies regions of interest (ROIs) such as a region where a large amount of compound to be identified is estimated to be included and a region where the compound is overlapped with another compound on one or more specific MS images, and specifies addition or subtraction of the ROIs. For each of the specified ROIs, an average MS/MS spectrum is calculated from MS/MS spectrum data at measurement points in the regions, and the average MS/MS spectra at the ROIs are subjected to addition or subtraction, to obtain an MS/MS spectrum. By addition between the ROIs, the intensity of peak derived from the target compound can be increased. By subtraction between the ROIs, a peak derived from the other compound overlapped with the target compound can be removed. When the MS/MS spectrum after addition or subtraction is subjected to library search for identification, a score indicating the similarity of the spectrum is higher than the conventional score, and the identification accuracy can be improved.

10 Claims, 10 Drawing Sheets

(56) References Cited

U.S. PATENT DOCUMENTS

| | | | | |
|---|---|---|---|---|
| 8,912,485 | B2 * | 12/2014 | Maier | H01J 49/40 250/282 |
| 9,087,680 | B2 * | 7/2015 | Shimada | H01J 49/022 |
| 9,495,753 | B2 * | 11/2016 | Iwasaki | G06T 7/11 |
| 10,312,067 | B2 * | 6/2019 | Ikegami | H01J 49/0004 |
| 10,551,247 | B1 * | 2/2020 | Van Benthem | G06F 17/18 |
| 2011/0127425 | A1 | 6/2011 | Kajihara | |
| 2011/0202282 | A1 * | 8/2011 | Kostrzewa | G16B 50/00 702/19 |
| 2014/0316717 | A1 | 10/2014 | Ikegami et al. | |
| 2015/0380225 | A1 | 12/2015 | Yamada | |
| 2016/0071711 | A1 | 3/2016 | Ikegami | |

FOREIGN PATENT DOCUMENTS

| | | | |
|---|---|---|---|
| EP | 2 797 104 | A2 | 10/2014 |
| EP | 2 980 579 | A1 | 2/2016 |
| JP | 2013-040808 | A | 2/2013 |
| JP | 2014-215043 | A | 11/2014 |
| WO | 2014/128912 | A1 | 8/2014 |
| WO | 2014/175211 | A1 | 10/2014 |
| WO | 2016/002047 | A1 | 1/2016 |

OTHER PUBLICATIONS

Judith M. Fonville, et al., “Robust Data Processing and Normalization Strategy for Maldi Mass Spectrometric Imaging”, American Chemical Society, Analytical Chemistry, Dec. 13, 2011, vol. 84, No. 3, pp. 1310-1319 (10 pages total).

“iMScope TRIO Imaging mass microscope,” [online], Shimadzu Corporation [search on Jun. 22, 2016], pp. 1/3-3/3.

International Search Report for PCT/JP2016/075094 dated Nov. 22, 2016 [PCT/ISA/210].

Written Opinion for PCT/JP2016/075094 dated Nov. 22, 2016 [PCT/ISA/237].

Communication dated Nov. 20, 2020 , from the China National Intellectual Property Administration in Application No. 201680088785.X.

Liang Yizeng et al., “Handbook of Analytical Chemistry ”, Chemical Industry Press, p. 331., Paragraph 6., Dec. 2000, (6 pages total).

* cited by examiner

IMAGING MASS SPECTROMETRY DATA PROCESSING DEVICE AND IMAGING MASS SPECTROMETRY DATA PROCESSING METHOD

CROSS REFERENCE TO RELATED APPLICATIONS

This application is a National Stage of International Application No. PCT/JP2016/075094 filed Aug. 26, 2016.

TECHNICAL FIELD

The present invention relates to an imaging mass spectrometry data processing device and an imaging mass spectrometry data processing method that process data obtained by mass spectrometry at each of a plurality of measurement points within a two-dimensional region on a sample.

BACKGROUND ART

In order to identify an unknown compound by mass spectrometry, library search using a library (database) including mass spectra of a large number of known compounds is generally performed.

For example, Patent Literature 1 discloses a method in which $MS^n$ analysis (n is an integer of two or more) is performed to compare an $MS^n$ spectrum of an obtained unknown compound with $MS^n$ spectra of a large number of known compounds that are stored in the library, scores indicating similarities of the mass spectra are each found, and the unknown compound is identified based on the scores.

$MS^2$ spectra of different compounds of which the chemical structures are partially common are similar to each other, and thus the compounds may be candidates for identification during library search. A method that eliminates the influence of similar compounds in such a case and identifies a target compound with exactitude is described in Patent Literature 2. In this method, for each peak on the mass spectra stored in the library, information indicating that the peak is or is not used in library search can be added. Therefore, when nonuse of a peak corresponding to a common part of a plurality of similar compounds, for example, a main skeleton, is set for library search, a score in which the similarity of a peak derived from a structure other than the main skeleton is reflected can be calculated. Thus, the identification accuracy of the target compound can be improved.

A sample that is an object to be analyzed does not generally contain an unknown compound alone as an object to be identified. The sample containing the unknown compound also contains other compounds. Therefore, when the unknown compound is identified by library search, the sample containing the unknown compound is introduced into a liquid chromatograph (LC), a gas chromatograph (GC), or an electrophoresis apparatus (CE), and the unknown compound as a target is separated from the other compounds, and then introduced into a mass spectrometer. The unknown compound may not completely be separated from the other compounds by LC or the like. However, in many cases, overlapping of the unknown compound with the other compounds can be eliminated, and as a result, the identification accuracy of the unknown compound can be highly improved.

In recent years, as a technique for examining the distribution of a substance in a sample that is two-dimensionally spread using mass spectrometry, mass spectrometry imaging has attracted attention. The mass spectrometry imaging is a technique in which mass spectrometry is performed at each of a large number of measurement points (micro regions) within a two-dimensional region on a sample such as a section of biological tissue, and from the obtained analysis results, the two-dimensional distribution of a compound having a specific mass-to-charge ratio is visualized. This technique is increasingly applied to drug discovery, discovery of biomarkers, and study of causes of various diseases. Mass spectrometers for mass spectrometry imaging are generally referred to as imaging mass spectrometers (see Non Patent Literature 1).

In general mass spectrometry imaging, a matrix for matrix-assisted laser desorption/ionization (MALDI) is directly applied to a surface of a sample that is a section of biological tissue, and ionization is often performed by a MALDI ion source as it is. In this case, a large number of compounds contained in the sample are ionized with mixing without separation, which is different from a case where the compounds are separated in advance by LC, GC, or CE as described above. On a mass spectrum, peaks derived from the large number of compounds appear. On the mass spectrum, peaks of a plurality of compounds that are different in composition but very similar in mass, or isomers that have the same composition but are only different in structure appear as an overlapped peak, that is, as if they were one compound.

The value of mass-to-charge ratio m/z of a peak on a mass spectrum corresponds to the mass-to-charge ratio of an ion in a state where an ion such as a proton (H) is added to a specific compound. In mass spectrometry of a biological sample, a peak of an ion in which a sodium (Na) ion or a potassium (K) ion that is generally contained in a living body is added to a compound instead of proton, or −H+2K, −H+2Na (wherein −H means that a proton is removed, and +2Na or +2K means that two Na ions or K ions are added) that is a combination of proton with a sodium or potassium ion, or the like is added, frequently appears on the mass spectrum. Further, a peak of an ion in which a matrix, a proton, or the like is added to a compound to be measured may appear on the mass spectrum depending on the kind of the matrix used. Moreover, a peak of an ion in which an ion such as H, K, and Na is added to a multimer of matrix molecule or the multimer from which a neutral molecule is removed may appear.

Therefore, an MS/MS spectrum is obtained with a peak at a specific mass-to-charge ratio that is an object to be identified selected as a peak of a precursor ion. In this case, the precursor ion includes ions derived from a plurality of compounds, and thus peaks of product ions derived from the plurality of compounds appear on the MS/MS spectrum. Accordingly, accurate identification may not be performed by the conventional library search described above. Specifically, the plurality of compounds mixed as precursor ions exhibit low scores and appear as search results.

Further, the precursor ion may include a compound that is not stored in the library. In this case, when the intensity of peak of product ion derived from the compound that is not stored in the library is high, a compound that is stored in the library may not be a candidate for identification as the result of library search.

As an example, FIG. 9A shows an MS/MS spectrum obtained in actual measurement when both an ion derived from a multimer of DHB as a matrix and an ion derived from a reduced glutathione are precursor ions. For comparison with the actually measured MS/MS spectrum, FIGS. 9B and 9C show a standard MS/MS spectrum of the multimer of DHB and a standard MS/MS spectrum of the reduced glutathione, respectively. The standard MS/MS spectra are stored in the library. As seen from FIGS. 9A, 9B, and 9C, the actually measured MS/MS spectrum includes both a peak of product ion derived from the multimer of DHB and a peak of product ion derived from the reduced glutathione.

When library search is performed for the actually measured MS/MS spectrum shown in FIG. 9A, the two compounds are found as candidates for identification. However, the score indicating the similarity of the multimer of DHB is "37," and the score indicating the similarity of the reduced glutathione is "34." These scores are considerably low as compared with "100" which is a score in perfect matching. Such scores indicating the similarity do not mean that identification is performed with sufficiently high reliability, and hardly show that the compounds are contained.

CITATION LIST

Patent Literature

Patent Literature 1: WO 2014/128912 A
Patent Literature 2: WO 2016/002047 A

Non Patent Literature

Non Patent Literature 1: "iMScope TRIO Imaging mass microscope," [online], SHIMADZU CORPORATION [search on Jun. 22, 2016], Internet

SUMMARY OF INVENTION

Technical Problem

The present invention is made in view of the problems. A primary object of the present invention is to provide an imaging mass spectrometry data processing device and an imaging mass spectrometry data processing method that are capable of identification with high accuracy when a compound existing in a sample is identified by library search of data obtained by an imaging mass spectrometer.

Solution to Problem

An imaging mass spectrometry data processing device according to the present invention, which is aimed at solving the aforementioned problems, is an imaging mass spectrometry data processing device for processing $MS^n$ spectrum data obtained by $MS^n$ analysis (n is an integer of two or more) at each of a plurality of measurement points within a predetermined region to be measured on a sample. The imaging mass spectrometry data processing device includes a) an image creation unit for creating a mass spectrometry image illustrating signal intensity distribution at a specific mass-to-charge ratio of the region to be measured or a part of the region to be measured based on the $MS^n$ spectrum data, b) a region-of-interest setting unit for setting a plurality of small regions as regions of interest on the mass spectrometry image or on an optical image corresponding to the region to be measured, c) an $MS^n$ spectrum acquisition unit for acquiring a calculated $MS^n$ spectrum that is obtained by addition or subtraction of average or typical $MS^n$ spectra at the plurality of regions of interest based on the $MS^n$ spectrum data at the measurement points in the plurality of regions of interest, and d) a compound identification unit for identifying a compound existing in the plurality of regions of interest using the calculated $MS^n$ spectrum.

An imaging mass spectrometry data processing method according to the present invention, which is aimed at solving the aforementioned problems, is a method that is realized by the imaging mass spectrometry data processing device according to the present invention. The method is a method for processing $MS^n$ spectrum data obtained by $MS^n$ analysis (n is an integer of two or more) at each of a plurality of measurement points within a predetermined region to be measured on a sample, and includes a) an image creation step of creating a mass spectrometry image illustrating signal intensity distribution at a specific mass-to-charge ratio of the region to be measured or a part of the region to be measured based on the $MS^n$ spectrum data, b) a region-of-interest setting step of setting a plurality of small regions as a plurality of regions of interest on the mass spectrometry image or an optical image corresponding to the region to be measured, c) an $MS^n$ spectrum acquisition step of acquiring a calculated $MS^n$ spectrum obtained by addition or subtraction of $MS^n$ spectra at the plurality of regions of interest based on the $MS^n$ spectrum data at the measurement points in the plurality of regions of interest, and d) a compound identification step of identifying a compound existing in the plurality of regions of interest using the calculated $MS^n$ spectrum.

In the imaging mass spectrometry data processing device according to the present invention that performs the imaging mass spectrometry data processing method according to the present invention, for example, when the user specifies a specific mass-to-charge ratio that is estimated to be involved in a target compound as an object to be identified, the image creation unit creates a mass spectrometry image illustrating the signal intensity distribution of a product ion at the specific mass-to-charge ratio of a region to be measured or a part of the region to be measured based on $MS^n$ spectrum data collected. A portion where the signal intensity is high on the mass spectrometry image is estimated to be a portion where the abundance of the target compound is high. Therefore, the region-of-interest setting unit sets a small region where the signal intensity is relatively high on the mass spectrometry image as a region of interest, for example. The setting of the region of interest by the region-of-interest setting unit may be performed automatically based on the mass spectrometry image or an optical image by an optical microscope that optically observes a sample, or performed in response to a manual instruction based on user's judgment in which the user visually checks the mass spectrometry image or the optical image. The size and number of the region of interest are arbitrary.

When the plurality of regions of interest are set, the $MS^n$ spectrum acquisition unit determines an average $MS^n$ spectrum at each of the plurality of regions of interest using $MS^n$ spectrum data at each measurement point in the plurality of regions of interest, and adds the average $MS^n$ spectra at the plurality of regions of interest to acquire a calculated $MS^n$ spectrum. Instead of the average $MS^n$ spectra, a typical $MS^n$ spectrum at each of the regions of interest may be used. As the typical $MS^n$ spectrum, for example, an $MS^n$ spectrum at a measurement point where the signal intensity of a product ion at the specific mass-to-charge ratio is the highest at the regions of interest may be selected, or a standard $MS^n$ spectrum at the regions of interest obtained by statistical analysis such as principal component analysis and hierarchical cluster analysis may be selected.

For example, an $MS^n$ spectrum determined by principal component analysis is a factor loading spectrum described below. In a process described below, principal component analysis is performed at all measurement points within a region to be measured. However, principal component analysis may be performed at only the measurement points within the regions of interest, and the factor loading spectrum for the resulting first principal component (or another principal component) may be used as the typical $MS^n$ spectrum.

For example, when the portion where the abundance of the target compound is high as described above is set for the plurality of regions of interest, the intensity of peak of a product ion derived from the target compound is likely to be relatively higher than the intensities of peaks of product ions derived from the other components. Therefore, when the calculated $MS^n$ spectrum is subjected to library search to determine a score indicating the similarity of spectrum, the score for a compound that is correct is high. Accordingly, the unknown compound existing in the regions of interest is likely to be accurately identified.

For example, when there is a compound that mostly evenly exists at the whole region to be measured on the sample, like a matrix for MALDI, a portion where the abundance of the target compound is high and a portion where the abundance of the target compound is low or the target compound hardly exists may be each set for the regions of interest, and the $MS^n$ spectrum acquisition unit may subtract the average or typical $MS^n$ spectrum at each of the plurality of regions of interest from the $MS^n$ spectra at the plurality of regions of interest. By subtraction of two $MS^n$ spectra, the intensity of peak derived from compounds that are common to the two $MS^n$ spectra and of which the amounts are similar to each other is close to zero. Therefore, by the subtraction, the intensity of peak of the product ion derived from the target compound is likely to be relatively higher than the intensity of peak of a product ion derived from the compound that mostly evenly exists at the whole region to be measured. In this case, when the calculated $MS^n$ spectrum is subjected to library search to determine a score indicating the similarity of spectrum, the score for a compound that is correct is high. Consequently, the unknown compound existing in the regions of interest is likely to be accurately identified.

When the $MS^n$ spectrum acquisition unit performs the subtraction of $MS^n$ spectra, the intensities of peaks to be eliminated by the subtraction are not necessarily even. Therefore, each intensity of peaks of at least one of the $MS^n$ spectra may be multiplied by an appropriate coefficient before the subtraction.

As described above, in the imaging mass spectrometry data processing device according to the present invention, the setting of regions of interest by the region-of-interest setting unit may be performed in response to the manual instruction based on the user's judgment.

Therefore, it is preferable that the imaging mass spectrometry data processing device according to the present invention further include an image display processing unit for displaying the mass spectrometry image or the optical image on a screen of a display unit, and a region-of-interest specifying unit for specifying an optional small region as a region of interest on the displayed mass spectrometry image or optical image by the user, and be configured so that the region-of-interest setting unit sets the small region specified by the region-of-interest specifying unit for the region of interest.

For example, the region-of-interest specifying unit can display a frame having optional shape and size on the displayed mass spectrometry image or the optical image displayed with the mass spectrometry image in response to an operation of a pointing device such as a mouse, and specify a portion surrounded by the frame as the region of interest.

According to this configuration, the user can simply specify the region of interest while the user confirms the mass spectrometry image on the screen. Therefore, the user can accurately specify the region of interest where the abundance of the target compound is estimated to be high.

In this case, the imaging mass spectrometry data processing device according to the present invention may further include a reference image creation unit for creating a plurality of reference mass spectrometry images illustrating the signal intensity distribution at a plurality of main mass-to-charge ratios based on the $MS^n$ spectrum data, an image classification unit for classifying the plurality of reference mass spectrometry images into one or more groups based on the similarity of signal intensity distribution, and a reference image display processing unit for displaying the classified reference mass spectrometry images on the screen of the display unit.

Herein, the "plurality of main mass-to-charge ratios" may be mass-to-charge ratios at a predetermined number of peaks detected in a decreasing order of signal intensity on an $MS^n$ spectrum obtained by adding all the $MS^n$ spectra at the whole region to be measured or at a plurality of appropriately selected measurement points or on an averaged $MS^n$ spectrum. Further, the image classification unit may classify the reference mass spectrometry images into one or more groups by principal component analysis or hierarchical cluster analysis.

The plurality of reference mass spectrometry images classified in the same group have a similar signal intensity distribution pattern. It is assumed that the possibility that there is a product ion derived from the same compound is high. Therefore, the user can decide a portion where there is only the target compound and specify the portion as the region of interest, or can decide overlapping of the target compound with another compound and specify the region of interest to be subtracted with reference to the displayed reference mass spectrometry images. As described above, the user can accurately specify an appropriate region of interest.

The reference image display processing unit may display on a screen of the display unit an image obtained by coloring typical reference mass spectrometry images in a plurality of classified groups with different colors and overlapping the images, and cause the region-of-interest setting unit to set the region of interest based on the image.

In the imaging mass spectrometry data processing device according to the present invention, the $MS^n$ spectrum acquisition unit may be configured to calculate an average $MS^n$ spectrum at the measurement point in each of the plurality of regions of interest, and acquire the calculated $MS^n$ spectrum by addition or subtraction of the average $MS^n$ spectra at the regions of interest.

According to this configuration, addition and subtraction of the $MS^n$ spectra at the plurality of regions of interest are simple. Further, the average $MS^n$ spectrum at each region of interest can be displayed. Therefore, when the user confirms the average $MS^n$ spectrum at each region of interest before or after addition or subtraction, the user easily decides whether or not the region of interest is appropriately specified.

In a first aspect of the imaging mass spectrometry data processing device according to the present invention, the compound identification unit refers to the library including the $MS^n$ spectra of known compounds, and performs compound identification, and the compound identification unit stores an $MS^n$ spectrum of a mixture containing one or more compounds to be mixed with the known compounds in the library with a mixing condition for the mixture.

When a part of analysis conditions during acquiring $MS^n$ spectrum data to be processed is consistent with the aforementioned mixing condition, the $MS^n$ spectrum in the library corresponding to the mixing condition is subtracted from the actually measured $MS^n$ spectrum and library search is performed.

When ionization by MALDI is performed, the compound to be mixed with the known compound is considered to be a matrix for MALDI. When the sample is, for example, a biological sample such as a section of biological tissue, the compound to be mixed with the known compound is considered to be a compound generally contained in the biological tissue. The mixing condition includes the kind of used matrix, the mass-to-charge ratio of precursor ion, and a dissociation condition of precursor ion.

When the analysis condition during acquiring the $MS^n$ spectrum data is consistent with the mixing condition stored in the library, a peak derived from the mixture is likely to appear on the actually measured $MS^n$ spectrum. According to the first aspect, the peak derived from the mixed compound is removed from the actually measured $MS^n$ spectrum or at least the signal intensity is decreased. Therefore, the score indicating the similarity of a compound that is correct as the target compound is further high.

In this case, each intensity of peaks of at least one of the $MS^n$ spectra may be multiplied by an appropriate coefficient followed by subtraction, similarly to the subtraction of $MS^n$ spectrum by the $MS^n$ spectrum acquisition unit.

In a second aspect of the imaging mass spectrometry data processing device according to the present invention, the compound identification unit refers to the library including the $MS^n$ spectra of known compounds, and performs compound identification, and the compound identification unit performs compound identification based on similarity between an $MS^n$ spectrum obtained by combining the plurality of $MS^n$ spectra stored in the library and the actually measured $MS^n$ spectrum.

Herein, for example, the number of combined $MS^n$ spectra may be set to "two" or the like in advance, or specified by the user.

In the second aspect, the compound identification unit selects a predetermined number of $MS^n$ spectra from a large number of $MS^n$ spectra stored in the library, and adds the intensity of peak on each of the $MS^n$ spectra. At that time, the intensity of peak on one or more $MS^n$ spectra, if not all, of the plurality of $MS^n$ spectra may be multiplied by an appropriate coefficient, followed by addition. This coefficient may also be specified as appropriate by the user, or be set to a coefficient at a plurality of stages that varies by a predetermined step within a range that is specified by the user or determined in advance. While the combination of selected $MS^n$ spectra and the coefficient to be multiplied are changed, the similarity between the added $MS^n$ spectra and the actually measured $MS^n$ spectrum is calculated, and the combination of $MS^n$ spectra and the coefficient that achieve high similarity are represented as a result for identification to the user. Even when the influence of the other compound overlapped with the target compound is not sufficiently removed, significant information for identifying the target compound is likely to be obtained.

In a third aspect of the imaging mass spectrometry data processing device according to the present invention, the compound identification unit refers to the library including the $MS^n$ spectra of known compounds, and performs compound identification, and the compound identification unit performs compound identification based on similarity between an $MS^n$ spectrum obtained by shifting each peak on the $MS^n$ spectra stored in the library upwardly or downwardly by a predetermined mass-to-charge ratio and the actually measured $MS^n$ spectrum.

Herein, for example, the value of mass-to-charge ratio by which the peak is shifted upwardly or downwardly may be determined in advance according to the kind of adduct ion assumed to be observed, or the amount of addition product added to the ion, or be optionally specified by the user. Alternatively, while the shift amount is changed by a predetermined step width, the similarity between each of the $MS^n$ spectra having different shift amounts and the actually measured $MS^n$ spectrum may be calculated.

Even when an $MS^n$ spectrum in consideration of the adduct ion is not stored in the library, or in actual measurement, an adduct ion is produced by addition of a substance that is not assumed on the $MS^n$ spectra stored in the library, a candidate of a compound that is correct as the target is likely to be found according to the third aspect.

The first to third aspects according to the present invention are not limited to an imaging mass spectrometry data processing device and an imaging mass spectrometry data processing method, and can be applied to a general mass spectrometry data processing device and a general mass spectrometry data processing method that perform compound identification by library search.

That is, a first mass spectrometry data processing device involved in the present invention is a mass spectrometry data processing device for processing $MS^n$ spectrum data obtained by $MS^n$ analysis (n is an integer of one or more) for a sample, including a) a library in which an $MS^n$ spectrum of a mixture containing one or more compounds to be mixed with the known compound is stored with a mixing condition for the mixture, and b) a compound identification unit that compares the $MS^n$ spectrum data with the $MS^n$ spectra in the library to identify a compound in the sample, and that subtracts the $MS^n$ spectrum in the library corresponding to the mixing condition from an actually measured $MS^n$ spectrum and performs library search when a part of analysis conditions during acquiring the $MS^n$ spectrum data is consistent with the aforementioned mixing condition.

Then, a second mass spectrometry data processing device involved in the present invention is a mass spectrometry data processing device for processing $MS^n$ spectrum data obtained by $MS^n$ analysis (n is an integer of one or more) for a sample, including a) a library in which $MS^n$ spectra of known compounds are stored, and b) a compound identification unit that compares the $MS^n$ spectrum data with the $MS^n$ spectra in the library to identify a compound in the sample, and that identifies the compound based on similarity between an $MS^n$ spectrum obtained by combining the plurality of $MS^n$ spectra stored in the library and an actually measured $MS^n$ spectrum.

Advantageous Effects of Invention

When $MS^n$ spectrum data, wherein n is two or more, for a biological sample or the like obtained by an imaging mass spectrometer are subjected to library search to identify a target compound existing in the sample, the imaging mass spectrometry data processing device or the imaging mass spectrometry data processing method according to the present invention can decrease or eliminate the influence of another compound coexisting with the target compound and identify the target compound with high accuracy.

BRIEF DESCRIPTION OF DRAWINGS

FIGS. 3A to 3C are views illustrating the distinctive data processing during identification of a compound in a sample by the imaging mass spectrometer of the embodiment.

DESCRIPTION OF EMBODIMENTS

Hereinafter, an embodiment of imaging mass spectrometer using the imaging mass spectrometry data processing device according to the present invention will be described with reference to the attached drawings.

Figure 1:
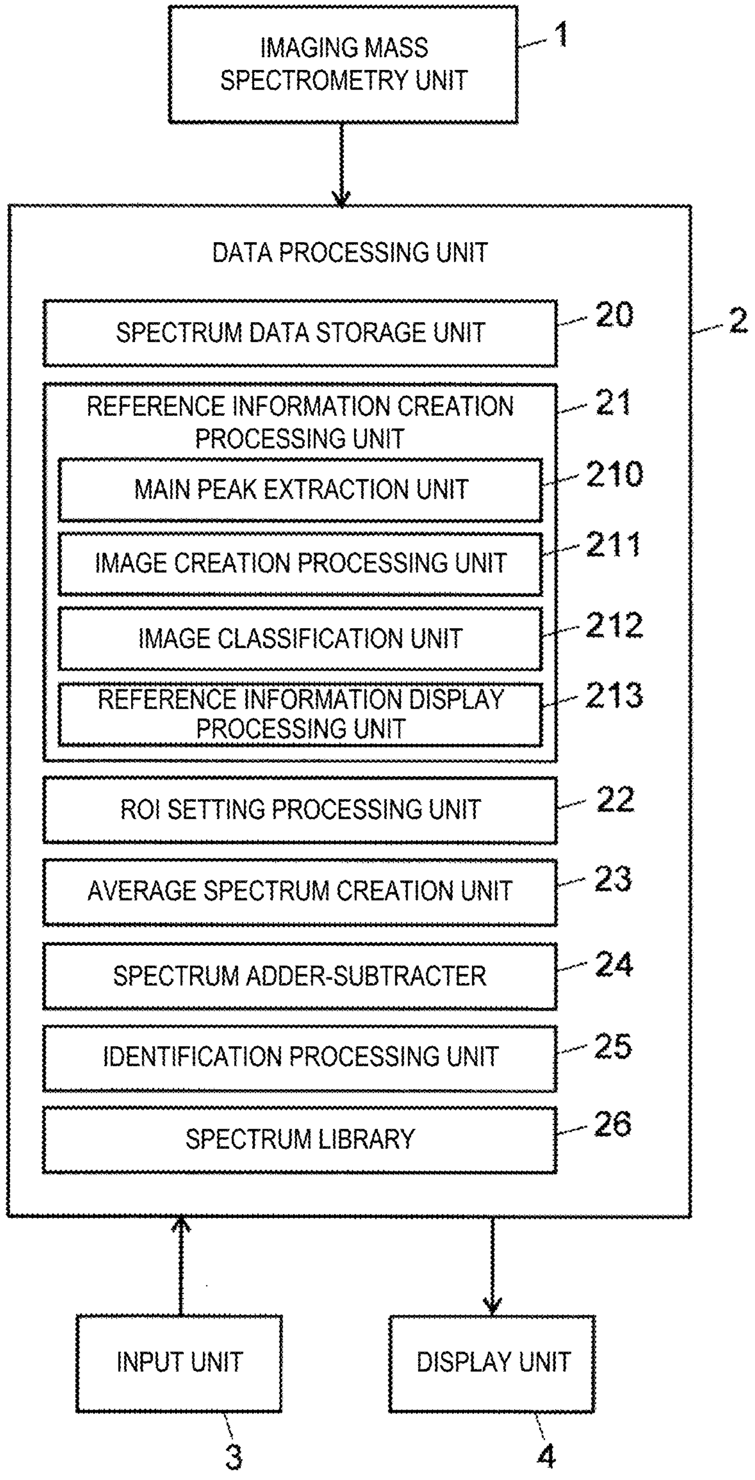
FIG. 1 is a schematic configuration diagram of an embodiment of an imaging mass spectrometer using an imaging mass spectrometry data processing device according to the present invention.

FIG. 1 is a schematic configuration diagram of an imaging mass spectrometer according to the present embodiment.

The imaging mass spectrometer of the embodiment includes an imaging mass spectrometry unit 1 that performs mass spectrometry for a sample, a data processing unit 2 that performs various kinds of data processing for data obtained by the imaging mass spectrometry unit 1, as described below, an input unit 3 that is operated by the user (analyzer), and a display unit 4 that displays an analysis result and the like for representation to the user.

The imaging mass spectrometry unit 1 includes an air pressure MALDI ion source, an ion trap, and a time-of-flight mass spectrometer (TOFMS), which are not shown. The imaging mass spectrometry unit 1 performs mass spectrometry (MS analysis and MS/MS analysis) at each of a large number of measurement points within a region to be measured on a sample specified by the user. As a result, MS ($=MS^1$) spectrum data and MS/MS ($=MS^2$) spectrum data at each measurement point over a predetermined mass-to-charge ratio range can be obtained.

The data processing unit 2 includes, as functional blocks, a spectrum data storage unit 20, a reference information creation processing unit 21, a region-of-interest (ROI) setting processing unit 22, an average spectrum creation unit 23, a spectrum adder-subtracter 24, an identification processing unit 25, a spectrum library 26, and the like.

The reference information creation processing unit 21 includes, as further functional blocks, a main peak extraction unit 210, an image creation processing unit 211, an image classification unit 212, and a reference information display processing unit 213. The spectrum library 26 includes standard MS spectra and MS/MS spectra of a large number of known compounds with associated compound information (compound name, composition formula, theoretical molecular weight, CAS number, etc.).

The data processing unit 2 is actually a personal computer (or a higher-performance workstation). The data processing unit 2 executes a dedicated software application for data processing previously installed in this computer to achieve the function of each block.

Hereinafter, an operation that is performed by the user during identification of a compound that is specifically distributed in a biological sample using the imaging mass spectrometer of the embodiment and a processing operation of the imaging mass spectrometer will be described.

Figure 2:
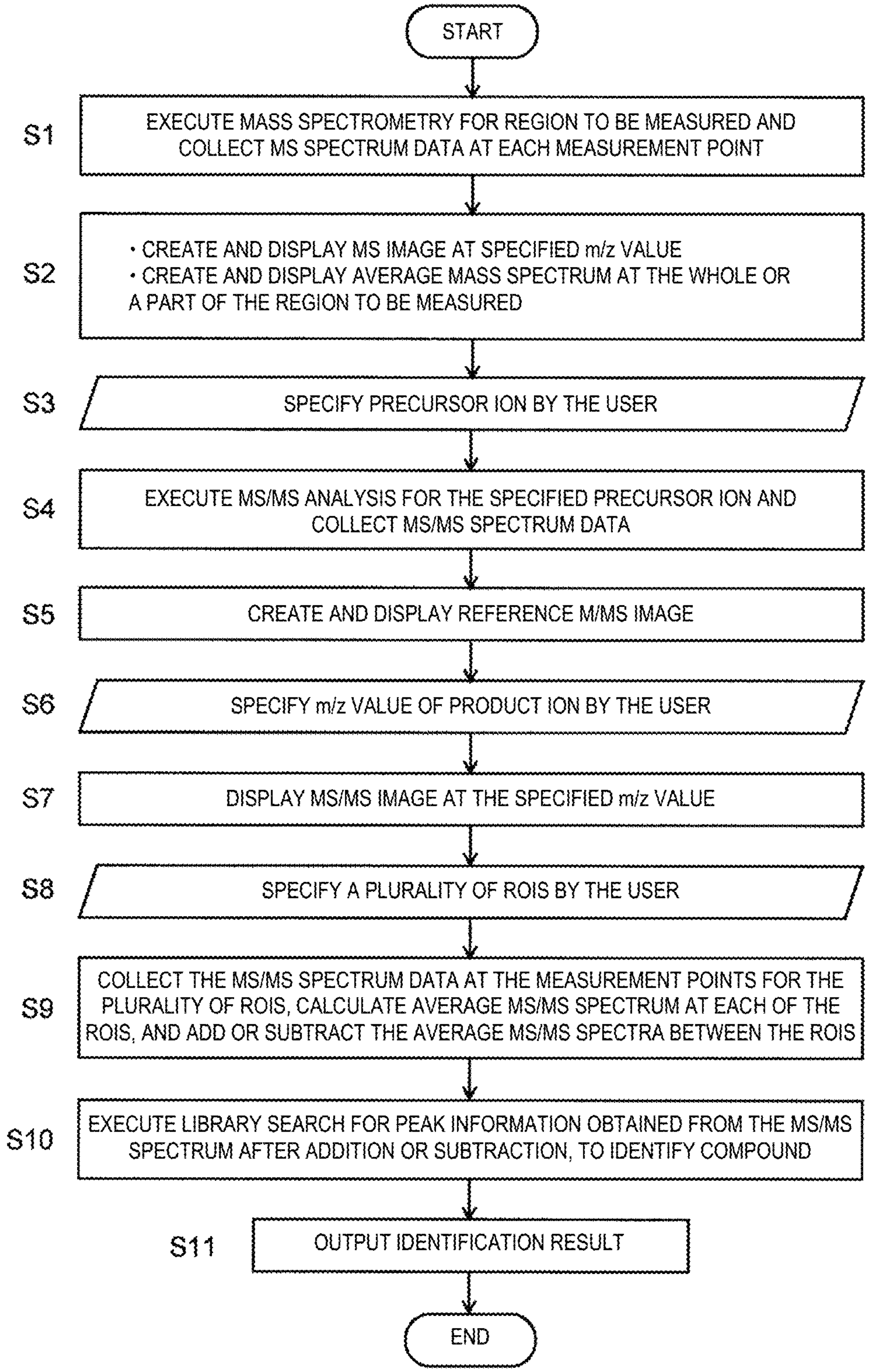
FIG. 2 is a flowchart of distinctive data processing during identification of a compound in a sample by the imaging mass spectrometer of the embodiment.

FIG. 2 is a flowchart of distinctive data processing at that time. FIG. 3 is a view illustrating the data processing.

The imaging mass spectrometry unit 1 first performs mass spectrometry at each of a large number of measurement points within a region to be measured that is two-dimensionally spread on a sample, and collects MS spectrum data (Step S1). Data obtained at one of the measurement points are data constituting a mass spectrum over the predetermined mass-to-charge ratio m/z range. The obtained data are sent to the data processing unit 2, and stored in the spectrum data storage unit 20 so as to be associated with spatial position information of the measurement point. In general, the imaging mass spectrometry unit 1 is provided with an optical microscope, and the user can specify the region to be measured with reference to an optical image by the optical microscope.

In response to a predetermined input operation using the input unit 3 by the user, the image creation processing unit 211 then creates an MS image exhibiting the two-dimensional distribution of signal intensity at a specific mass-to-charge ratio specified by the user, of the whole region to be measured or a certain region specified by the user based on the mass spectrum data stored in the spectrum data storage unit 20, and displays the MS image on a screen of the display unit. At this time, the optical image can also be displayed on the screen of the display unit 4. In response to a predetermined input operation using the input unit 3 by the user, the average spectrum creation unit 23 creates an average mass spectrum that is obtained by averaging mass spectra obtained at the measurement points in the whole region to be measured or the region specified by the user, and displays the average mass spectrum on the screen of the display unit 4. The user specifies an ion that is estimated to be derived from a target compound to be identified as a precursor ion, while the user refers the MS image and the average mass spectrum that are thus displayed, and if necessary, refers the information of the known compounds stored in the spectrum library 26 (Step S3).

When the user specifies the mass-to-charge ratio of the precursor ion, the imaging mass spectrometry unit 1 performs MS/MS analysis at the large number of measurement points within the region to be measured using the specified precursor ion as a target, and collects MS/MS spectrum data (Step S4). When the specified precursor ion is an ion derived from only the target compound, only a product ion derived from the target compound appears on the MS/MS spectrum. However, when an ion derived from a compound other than the target compound is overlapped with the specified precursor ion, a peak of the product ion derived from the target compound and a peak of a product ion derived from the other compound also appear on the MS/MS spectrum. In this case, when this MS/MS spectrum is subjected to library search as it is for compound identification, a compound that is correct as the target compound may not be identified so as to exhibit sufficient similarity (that is, cannot be identified), or another compound that is incorrect may be found as a candidate.

Therefore, in the imaging mass spectrometer of the embodiment, the reference information creation processing unit 21 first creates as a reference MS/MS image an MS/MS image of a product ion at a main mass-to-charge ratio observed by MS/MS analysis, and displays the MS/MS image on the screen of the display unit 4 (Step S5). More specifically, the reference information creation processing unit 21 executes the following process.

The main peak extraction unit 210 determines an MS/MS spectrum obtained by averaging the MS/MS spectra obtained at all the measurement points within the region to be measured, detects a peak of the MS/MS spectrum in accordance with a predetermined criterion as a main peak. For example, the main peak extraction unit 210 may detect a peak in which the peak intensity is equal to or higher than a predetermined threshold level, or detect a predetermined number of peaks in a decreasing order of peak intensity. The main peak extraction unit 210 usually detects a plurality of main peaks.

The image creation processing unit 211 creates as reference MS/MS images MS/MS images at the mass-to-charge ratios of the main peaks. The image classification unit 212 classifies a large number of images into groups according to the similarity of two-dimensional distribution. In the classification of the images, statistical analysis such as principal component analysis and hierarchical cluster analysis can be used.

Figure 4:
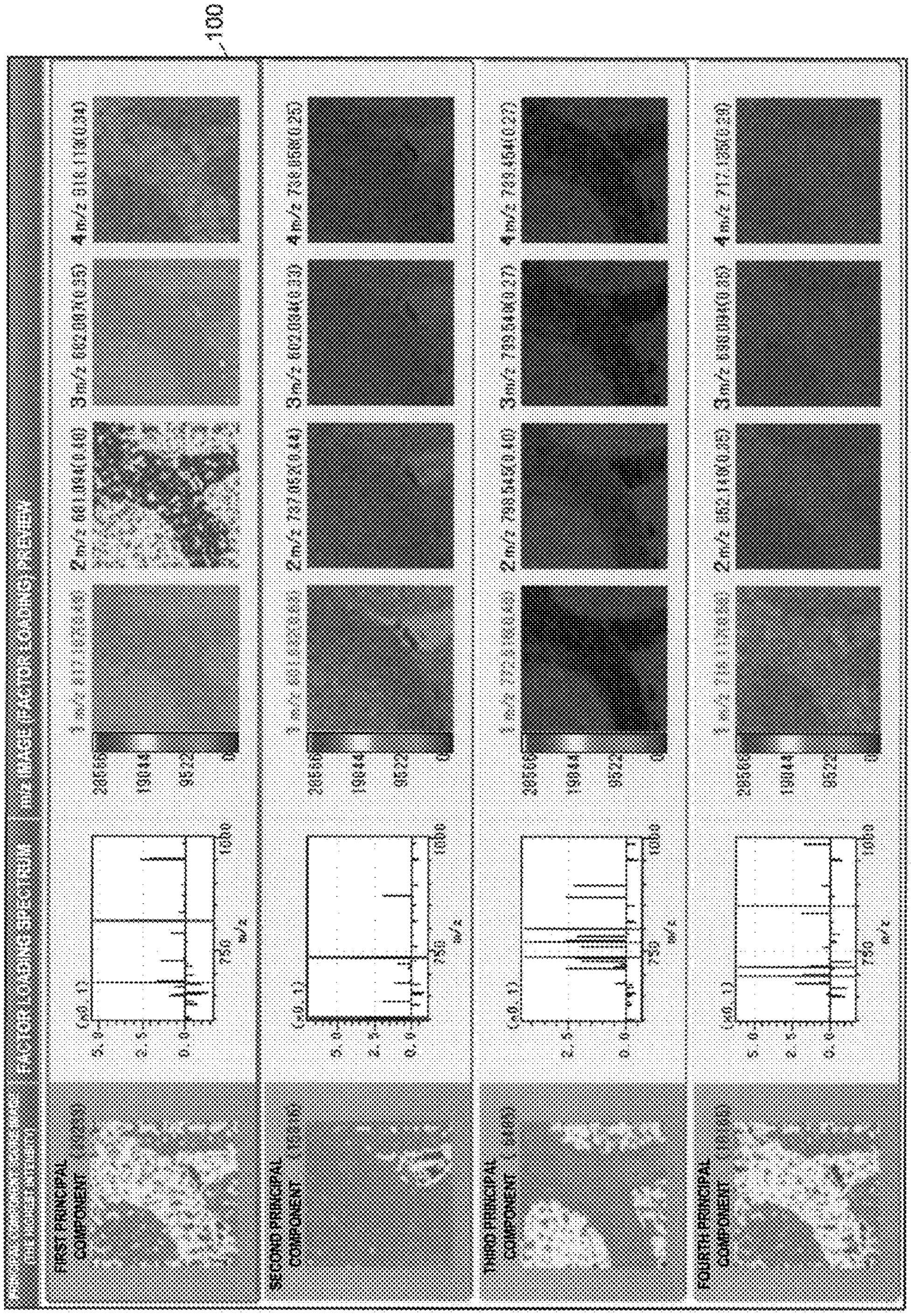
FIG. 4 is a view illustrating an example of displayed reference mass spectrometry images used during specifying a ROI in the imaging mass spectrometer of the embodiment.

FIG. 4 is an example illustrating displayed reference MS/MS images classified by principal component analysis.

In this example, matrix data including m/z values of a plurality of main peaks and intensity information of the main peaks at each measurement point are subjected to principal component analysis using each of the m/z values as an explanatory variable. A linear combination of each of the m/z values is obtained as a principal component (i.e., second, third, . . . principal components). A two-dimensional distribution image is created based on the intensity of each pixel (measurement point) of the MS/MS spectrum data for the linear combination of the m/z value. The two-dimensional distribution image is an image at the leftmost in a reference image displaying screen 100 shown in FIG. 4. This image is considered to be a heat map indicating a standard two-dimensional distribution at the m/z value classified as a group of the principal component. FIG. 4 shows a factor loading spectrum exhibiting the size of factor loading (principal component loading) at each of the m/z values calculated from a principal component score on the right of the aforementioned image, and MS/MS images at the m/z values in an order of the m/z values in which factor loadings in each principal component are decreased, on the right of the factor loading spectrum. The factor loading spectrum is a spectrum in which the factor loading determined at each of the m/z values is represented like a mass spectrum.

By the reference image displaying screen 100, a distinctive spatial distribution in the MS/MS imaging data and each MS/MS image similar to the distribution can be collectively confirmed.

Instead of or in addition to the information shown in FIG. 4, an image in which typical reference MS/MS images in groups classified by principal component analysis are colored with different colors and overlapped may be created and displayed as a reference image for ROI setting.

Figure 5:
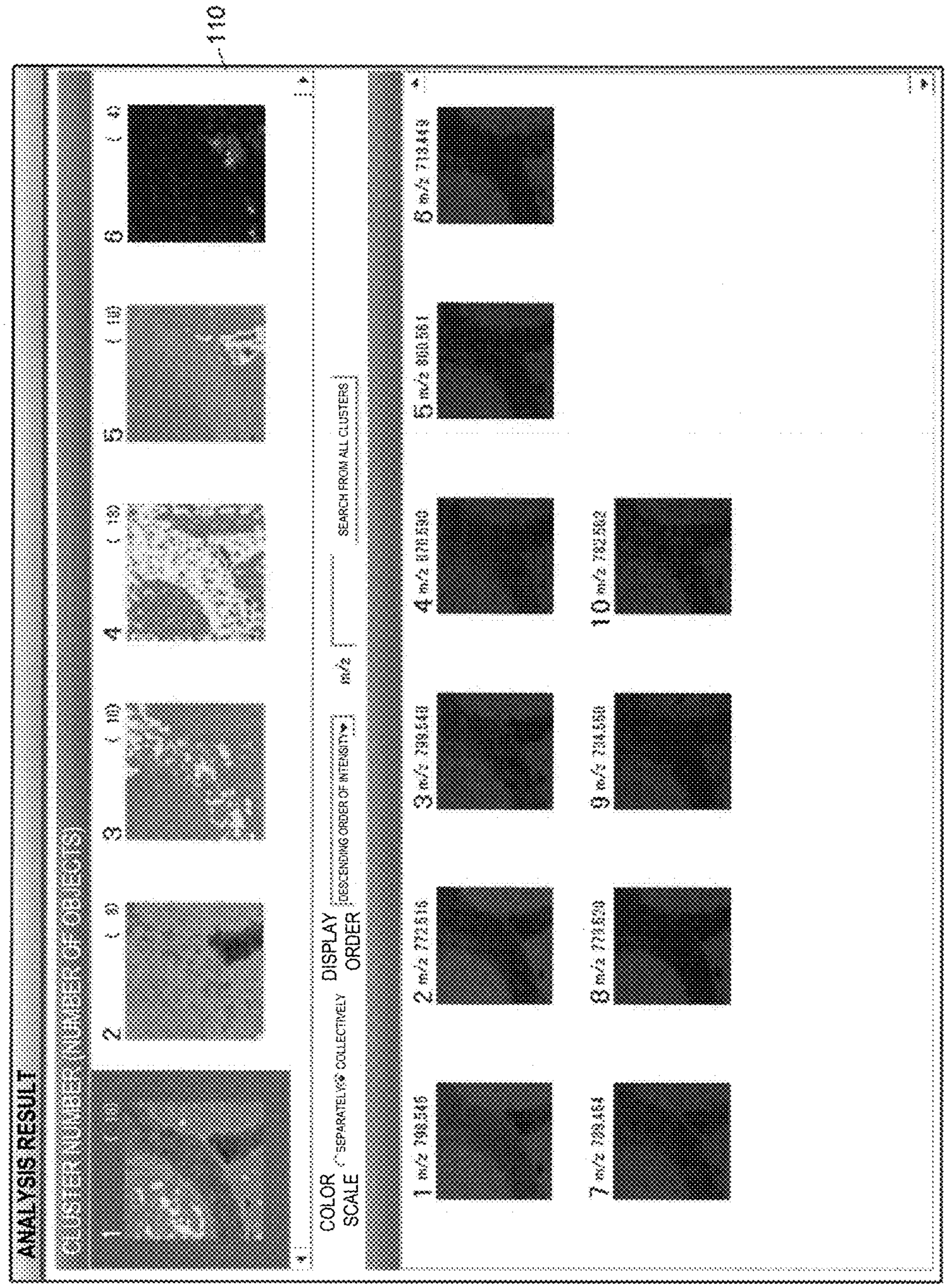
FIG. 5 is a view illustrating another example of displayed reference mass spectrometry images used during specifying a ROI in the imaging mass spectrometer of the embodiment.

FIG. 5 is an example illustrating displayed reference MS/MS images classified by hierarchical cluster analysis.

The MS/MS imaging data at each of the m/z values are subjected to hierarchical clustering as an object to be classified. The MS/MS images are classified into the number of clusters specified by the user, or the number of clusters automatically determined by a Jain-Dubes method, an x-means method, an Upper Tail method, or the like. The MS/MS images at the m/z values are grouped for each cluster and displayed.

At an upper area of a reference image displaying screen 110 shown in FIG. 5, a typical image of each cluster is displayed. When the user selects one of the images by a click operation or the like, the MS/MS images at the m/z values that belong to the cluster (are classified) are displayed on a lower area as a list.

By the reference image displaying screen 110, a distinctive spatial distribution in the MS/MS imaging data and a plurality of MS/MS images included in one of the clusters can be confirmed.

In Step S5, the reference MS/MS images are classified. As seen from the result, when there is only one kind of distribution pattern, the precursor ion of the MS/MS spectrum tends to include only one kind of compound. In contrast, as seen from the result of classification of the reference MS/MS images, when there are a plurality of kinds of distribution patterns, peaks of the distribution patterns tend to be peaks of product ions derived from different compounds. Therefore, the user can recognize a region that is estimated to contain only the target compound or particularly the target compound in a large amount and specify a ROI based on the spatial distribution information displayed. Further, the user can judge whether the distribution region of the other compound is overlapped with the distribution region of the target compound, and when overlapping is judged, the user can specify subtraction, but not addition of the average MS/MS spectrum during specifying the ROI as described below.

Figure 3A:
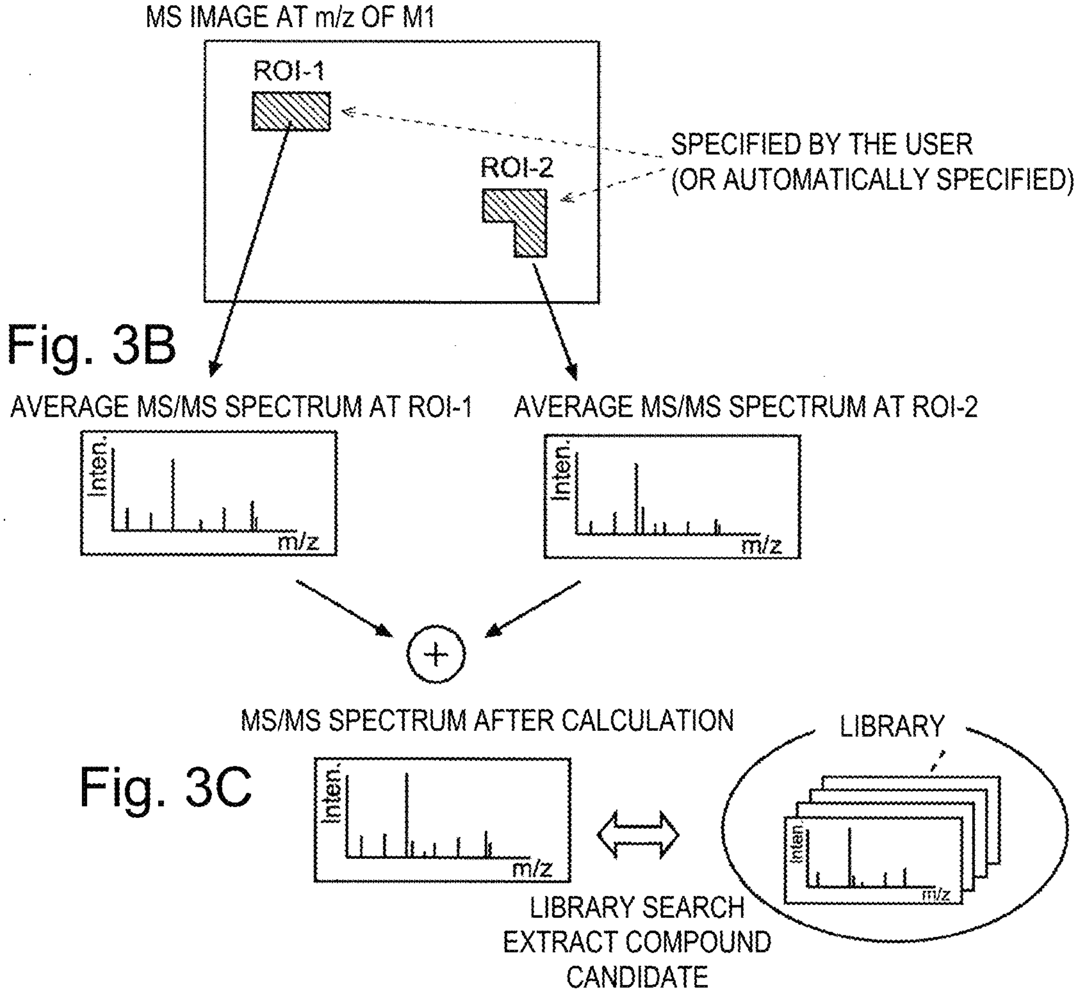

As described above, the user confirms the displayed reference MS/MS images, and specifies an appropriate m/z value that is estimated to be close to the distribution of the target compound (Step S6). As a result, the ROI setting processing unit 22 displays the MS/MS image at the specified m/z value on the screen of the display unit 4 (Step S7). For example, the MS/MS images at a plurality of m/z values can be displayed side by side. On the MS/MS image or the optical image while the MS/MS image is referred, the user specifies a plurality of regions of interest (ROI), and selects an addition or subtraction process of the average MS/MS spectra as a process to be executed (Step S8). For example, when as shown in FIG. 3A, an operation of drawing a frame so as to surround an optional range on the displayed MS/MS image is performed by a pointing device, the ROI setting processing unit 22 recognizes the drawn frame, and sets the range surrounded by the frame for a ROI. The user can specify an optional number of ROIs having an optional size. When the subtraction process is selected, a ROI to be subtracted and a subtracting ROI are specified. In a case of addition process, the specifying is not necessary.

When the ion derived from the compound other than the target compound is overlapped with the precursor ion as described above, the peak of the product ion derived from the target compound and the peak of the product ion derived from the other compound are mixed on the MS/MS spectrum. On the MS/MS image at the mass-to-charge ratio (for example, in FIG. 3A, m/z is M1) that is estimated to be a mass-to-charge ratio of the product ion derived from the target compound, a portion where the signal intensity is high is estimated to be a portion where the abundance of the target compound is high. Therefore, the user specifies the portion where the signal intensity is high as the ROI.

In response to an operation by the user, the ROI setting processing unit 22 sets a plurality of ROIs. The average spectrum creation unit 23 then acquires MS/MS spectrum data corresponding to a measurement point in each of the plurality of ROIs from the spectrum data storage unit 20, and calculates an average MS/MS spectrum for each of the ROIs, as shown in FIG. 3B. When the addition process is selected in Step S8, the spectrum adder-subtracter 24 adds the average MS/MS spectra at the ROIs to each other to calculate an MS/MS spectrum after the addition process, as shown in FIG. 3C (Step S9).

When the portion where the signal intensity is high is specified as a ROI on the MS/MS image as described above, the peak of the product ion derived from the target compound appears on the average MS/MS spectra at the ROIs so as to exhibit high signal intensity. In this case, the signal intensity of peak of the product ion derived from the other compound that coexists may be relatively low. States of the plurality of ROIs are the same. Therefore, when the average MS/MS spectra at the ROIs are added to each other, a difference between the signal intensity of peak of the product ion derived from the target compound and the signal intensity of peak of the product ion derived from the other compound is increased. Accordingly, the intensity of peak of the product ion derived from the target compound is higher than that of the other compound.

The identification processing unit 25 performs library search for information of peak detected on the MS/MS spectrum after the addition process, to identify a compound (Step S10). The peak information obtained from the MS/MS spectrum after the addition process is compared with the MS/MS spectra of various compounds stored in the spectrum library 26. The similarity of each spectrum pattern is calculated, and a compound having a high score indicating similarity is extracted as the target compound. The identification result, that is, information including the name of the compound that is a candidate for identification is displayed on the screen of the display unit 4 with the score of similarity (Step S11).

As described above, a difference between the peak intensity of the product ion derived from the target compound and the peak intensity of the product ion derived from the other compound on the MS/MS spectrum after the addition process is larger than that on the MS/MS average spectrum before the addition process. Therefore, when the similarity of spectrum pattern is calculated in identification process, the score of a compound candidate that is correct as the target compound is likely to be high. The identification accuracy of the target compound can be improved.

In order to decrease the influence of the other compound that coexists with the target compound, the user specifies a ROI where the other compound and the target compound coexist, and a ROI where only the other compound exists or the other compound exists so as to exhibit particularly high signal intensity, and selects subtraction of the latter from the former. In this case, the peak intensity of the product ion derived from the other compound on the MS/MS spectrum decreases. Therefore, the score of a compound candidate that is correct as the target compound during identification process by library search is likely to be high, as described above. The identification accuracy of the target compound can be improved.

In order to certainly remove an unwanted peak during subtraction of the MS/MS spectra, a spectrum to be subtracted may be multiplied by a specific coefficient followed by subtraction. Alternatively, when the m/z value of peak of a spectrum to be subtracted coincides with the m/z value of peak of the original MS/MS spectrum within a certain allowable range, the peak may be eliminated from the original MS/MS spectrum regardless of signal intensity, followed by library search.

As a specific example of the process described above, a case in which the technique of the embodiment is applied to an MS/MS spectrum data obtained by using the mixture of multimer of DHB and reduced glutathione and identification is performed will be described.

In this case, the conventional and general library search as described above is performed. As a result, the score of similarity is low, but the DHB and reduced glutathione are found as candidates for identification. On the MS/MS spectrum stored in the spectrum library 26, it is shown that the peak of a main product ion of the reduced glutathione is at a m/z of 178 (in a case of a proton-added ion, the m/z is 179). An MS/MS image at the mass-to-charge ratio of this peak is displayed. This shows a rough two-dimensional distribution of the reduced glutathione. Similarly, the main product ion peak of multimer of DHB is at an m/z of 290, which is not included in a product ion of the reduced glutathione. Therefore, when an MS/MS image at the mass-to-charge ratio of this peak is displayed, a rough two-dimensional distribution of the multimer of DHB can be known.

Herein, the reduced glutathione is a target compound to be identified. Therefore, the MS/MS image at an m/z of 178 (in a case of the proton-added ion, the m/z is 179) is created, and two ROIs are set at a portion where the signal intensity is high on the image. An MS/MS spectrum obtained by adding average MS/MS spectra at measurement points in the ROIs to each other is subjected to library search. At that time, the score indicating the similarity of the reduced glutathione is "67," which is largely increased as compared with the conventional score.

On the other hand, when an MS/MS image at an m/z of 290 (in a case of the proton-added ion, the m/z is 291) that is the peak of product ion derived from the multimer of DHB is created, a portion where the abundance of multimer of DHB is high is found. Therefore, when an MS/MS spectrum obtained by subtracting an average MS/MS spectrum corresponding to a ROI where the intensity of product ion derived from the multimer of DHB is high from an average MS/MS spectrum corresponding to a ROI where the intensity of product ion derived from the reduced glutathione is subjected to library search, the score indicating the similarity of the reduced glutathione is similarly "67," which is largely increased as compared with the conventional score.

When the reference image displaying screen as shown in FIG. 4 or 5 is displayed in Step S5 in the imaging mass spectrometer of the embodiment, an image may be displayed so that typical images of images of which the spatial distributions are different are specified by the user and overlapped. In this case, the user may set a ROI at a region where only the target compound to be identified is distributed with reference to the displayed image obtained by overlapping, and perform compound identification based on an average value for MS/MS spectra at a plurality of measured points within the ROI.

In the imaging mass spectrometer of the embodiment, the diameter of a laser beam with which a sample is irradiated during mass spectrometry that does not cause ionic dissociation may be set so as to be smaller than the interval between laser irradiation points. Further, during MS/MS analysis, a portion that has not been irradiated with a laser beam during mass spectrometry may be set as a laser irradiation point within a region overlapped with a region that has been subjected to the mass spectrometry, and be then subjected to MS/MS analysis. In this case, even when the amount of the target compound in the sample near the portion irradiated with a laser beam is decreased by laser irradiation during the mass spectrometry, information of product ion of the compound during MS/MS analysis can be certainly obtained.

In the imaging mass spectrometer of the embodiment, the ROIs set during addition or subtraction of MS/MS spectra may be set within a single region to be measured of the same sample, different regions to be measured of the same sample, or regions to be measured of different samples. For example, a section of tissue of a specific organ of an animal to which a drug is administrated is used as a target sample, a section of tissue of the same organ of an animal to which any drug is not administrated is used as a control sample, and MS/MS analysis is performed on a peak of mass spectrum in which the intensity value varies due to administration of the drug. When the MS/MS spectrum at a ROI of the control sample is subtracted from the MS/MS spectrum at a ROI of the target sample, the variation of intensity value can be determined to be caused by increase or decrease in the amount of compound corresponding to the peak, appearance of another compound in the same amount, or the like.

Further, a mass spectrum to be added or subtracted may be a typical mass spectrum at a specific ROI based on data obtained by the imaging mass spectrometer, or for example, a mass spectrum obtained by another mass spectrometer such as a liquid chromatograph mass spectrometer (LCMS). The $MS^n$ spectrum of the compound stored in a spectrum library is desirably an $MS^n$ spectrum obtained for a standard sample by a device having the same system as that of the imaging mass spectrometer used for measurement, or an $MS^n$ spectrum obtained in an actual sample. Further, the $MS^n$ spectrum of the compound stored in the spectrum library may be an $MS^n$ spectrum based on data obtained by a mass spectrometer having another system, such as LCMS.

On a mass spectrum after subtraction process or a factor loading spectrum obtained by principal component analysis, a negative intensity value may appear. In this case, the negative value may be replaced with zero, followed by a subsequent search process.

In the imaging mass spectrometer of the embodiment, compound identification is performed based on similarity between an MS/MS spectrum determined from an actually measured MS/MS spectrum data at each measurement point and the standard MS/MS spectra of the known compounds stored in the spectrum library 26. However, the following identification process may be performed.

[First Modification of Identification Process]

Figure 6:
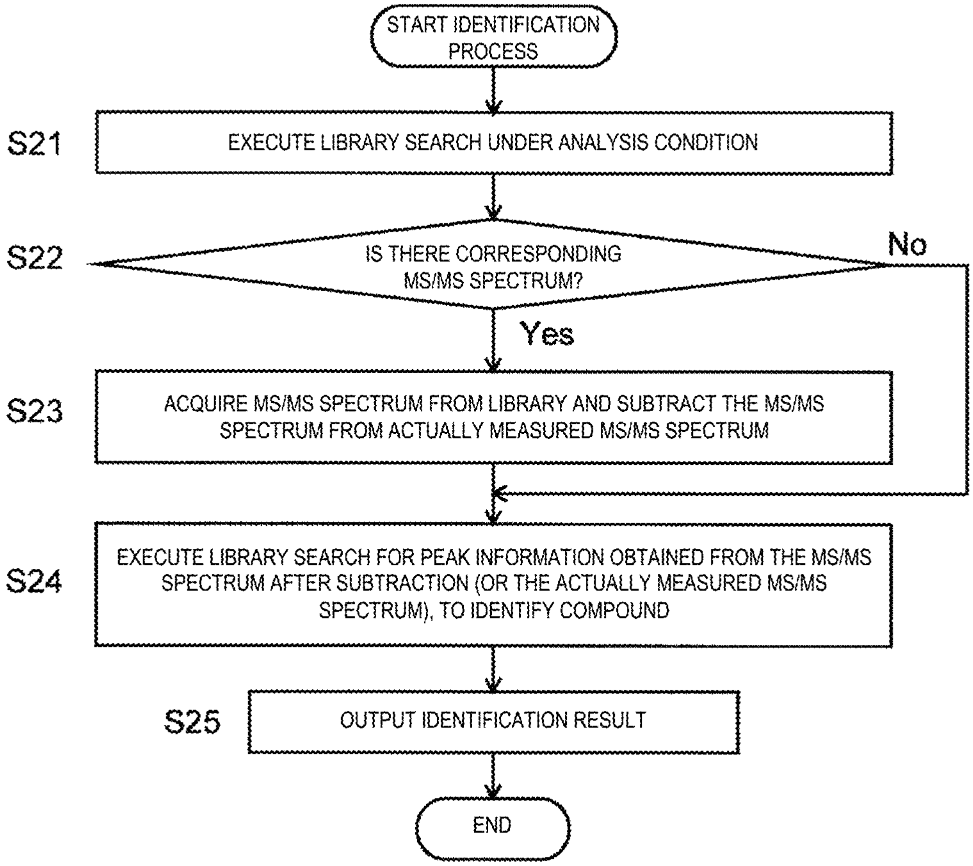
FIG. 6 is a flowchart showing an example of identification process by library search in the imaging mass spectrometer of the embodiment.

FIG. 6 is a flowchart of distinctive process that is executed by the identification processing unit 25 in a first modification.

In the embodiment described above, the MS/MS spectra stored in the spectrum library 26 correspond to those of the known compounds. In the first modification, an MS/MS spectrum of an unknown compound to be mixed with a compound, that is, a mixture that cannot be identified is stored in the spectrum library 26 with a mixing condition, that is, an analysis condition.

Figures 10A, 10B, 10C:
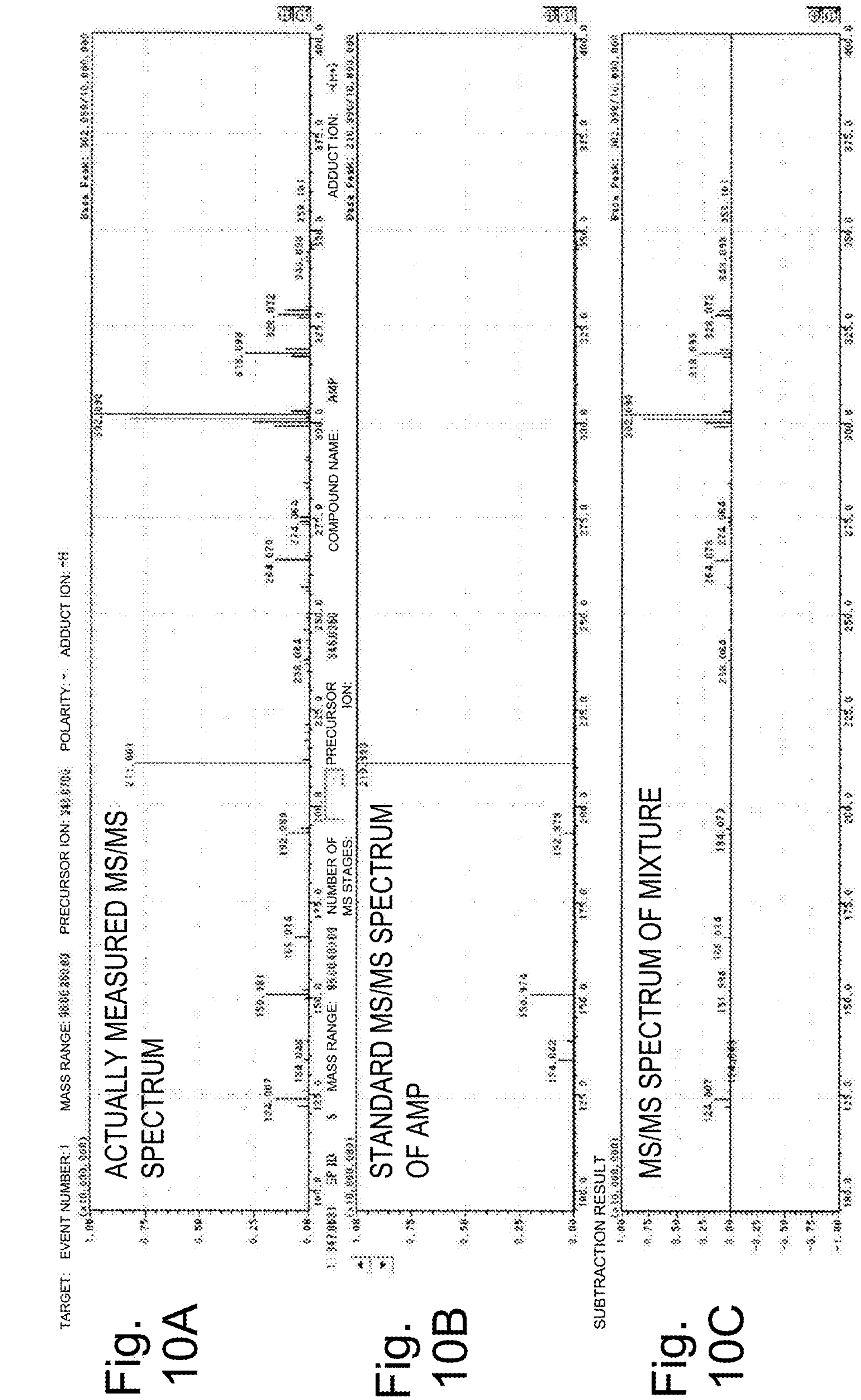
FIG. 10A is an actually measured MS/MS spectrum for a predetermined biological sample containing AMP using a 9-AA matrix.
FIG. 10B is a standard MS/MS spectrum of AMP alone.
FIG. 10C is an MS/MS spectrum obtained by subtracting the standard MS/MS spectrum of AMP from the actually measured MS/MS spectrum.

Specifically, a predetermined biological sample including adenylic acid (hereinafter abbreviated as "AMP") is subjected to MS/MS analysis using a 9-aminoacridine (hereinafter abbreviated as "9-AA") matrix in a negative ionization mode with the m/z value of precursor ion set to 349.07. As a result, an MS/MS spectrum shown in FIG. 10A is obtained. A standard MS/MS spectrum of AMP alone is shown in FIG. 10B. An MS/MS spectrum in which the standard MS/MS spectrum of AMP is subtracted from an actually measured MS/MS spectrum, as shown in FIG. 10C, is determined. This MS/MS spectrum shows an MS/MS spectrum of a mixture in which AMP may be mixed. This mixture may be one kind of compound or include a plurality of kinds of compounds. Even when the compound cannot be identified from the MS/MS spectrum of the mixture, the MS/MS spectrum of the mixture is stored in the spectrum library 26 with the analysis condition including the kinds of the matrix and the sample that used in analysis, and the m/z value of precursor ion.

When an MS/MS spectrum based on the actually measured data is given, the identification processing unit 25 performs search in the spectrum library 26 about presence or absence of an MS/MS spectrum corresponding to the analysis condition in which the data is obtained (Steps S21 and S22). When the corresponding MS/MS spectrum is found, the process advances from Step S22 to Step S23. When the corresponding MS/MS spectrum is not found, the process advances from Step S22 to Step S24 without the processing in Step 23.

For example, when the peak on the MS/MS spectrum of the mixture is derived from the 9-AA matrix, a compound generally contained in the biological sample, or a mixture of the 9-AA matrix and the compound, the aforementioned peak on the MS/MS spectrum of the mixture may appear also on an MS/MS spectrum obtained during MS/MS analysis of another biological sample under the same analysis condition. When in Step S22, the corresponding MS/MS spectrum is determined to be included in the library, the MS/MS spectrum is determined to be mixed with the actually measured MS/MS spectrum, and the MS/MS spectrum of the mixture read from the spectrum library 26 is subtracted from the actually measured MS/MS spectrum (Step S23). When the subtraction process is performed, the MS/MS spectrum after subtraction is subjected to general library search, and when the subtraction is not performed, the actually measured MS/MS spectrum is subjected to the general library search. Thus, compound identification is performed (Step S24).

Even when in Step S22, Yes is determined, the MS/MS spectrum of the mixture is not necessarily mixed with the actually measured MS/MS spectrum. Therefore, the MS/MS spectrum of the mixture may be displayed on the screen of the display unit 4 without automatically performing processes from Step S22 to Step S23 so that the user confirms the MS/MS spectrum and is then allowed to select whether or not the process of Step 23 is executed.

[Second Modification of Identification Process]

Figure 7:
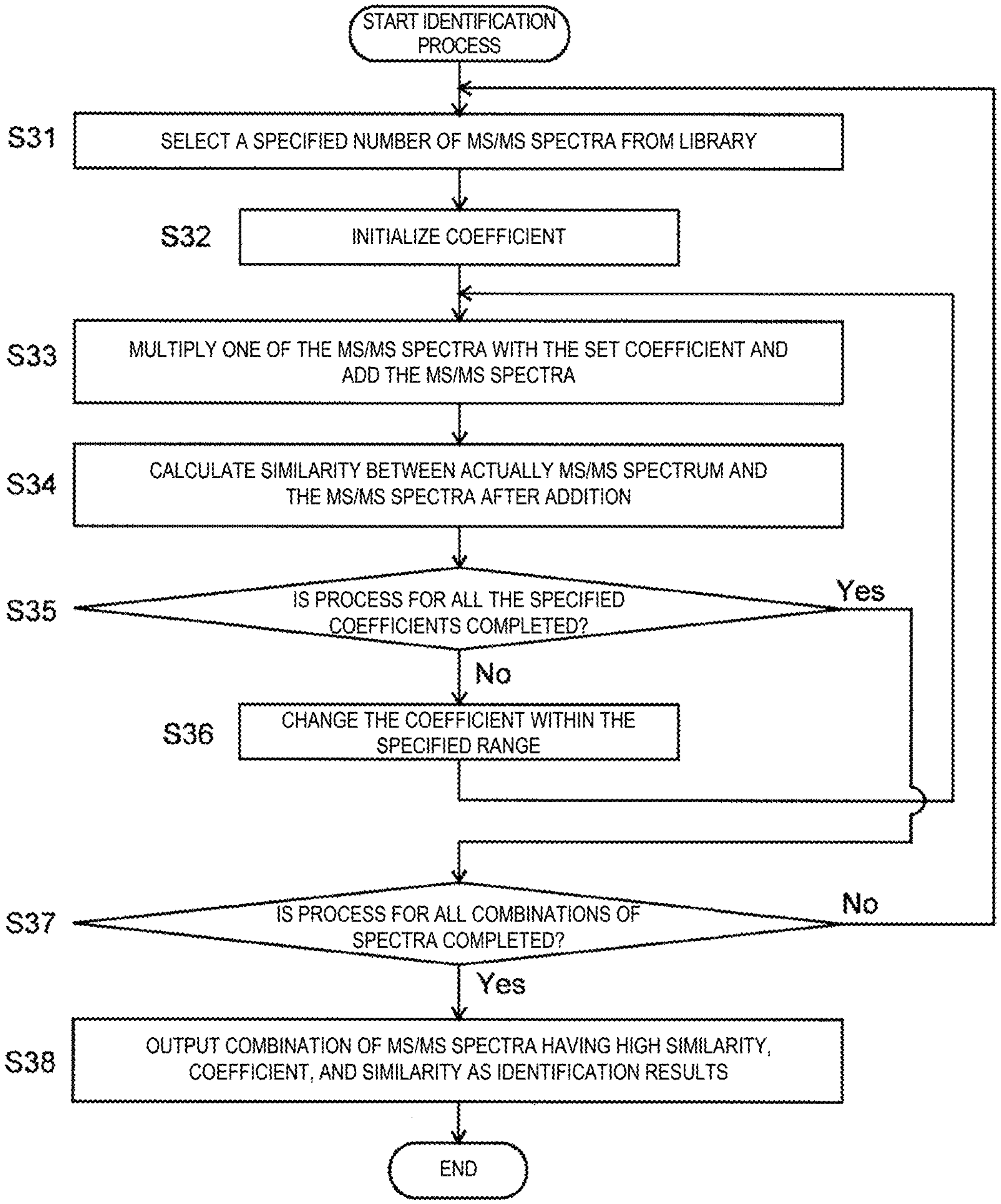
FIG. 7 is a flowchart showing another example of identification process by library search in the imaging mass spectrometer of the embodiment.

FIG. 7 is a flowchart of distinctive process that is executed by the identification processing unit 25 in a second modification.

In the embodiment described above, the similarity between each of the MS/MS spectra stored in the spectrum library 26 and the actually measured MS/MS spectrum is determined. In the second modification, an MS/MS spectrum obtained by combining a plurality of MS/MS spectra stored in the spectrum library 26, that is, an MS/MS spectrum obtained by adding the plurality of MS/MS spectra is also an object to be searched.

Specifically, when the actually measured MS/MS spectrum is given, the identification processing unit 25 first selects a previously specified number of MS/MS spectra from the spectrum library 26 (Step S31), then multiply the MS/MS spectra with an initially set coefficient, and adds the obtained MS/MS spectra (Steps S32 and S33). The number of selected MS/MS spectra may be specified in advance by the user. The range of the coefficient and the step width that changes the coefficient may be specified in advance by the user. In this case, the initially set value of coefficient can be automatically determined. The similarity between the MS/MS spectrum after the addition process and the actually measured MS/MS spectrum is calculated (Step S34). As a procedure for calculating the similarity, for example, a method described in Patent Literature 1 can be used. Whether a process for all coefficients that are determined depending on the specified coefficient range and the step width of the coefficient is completed is judged (Step S35). When the process is not completed, the coefficient is changed (Step S36), and the process is returned to Step S33. The processes of Steps S33 to S36 are repeated. Thus, the similarity between the MS/MS spectrum obtained by multiplying a combination of the selected MS/MS spectra with various kinds of coefficients and adding the obtained MS/MS spectra, and the actually measured MS/MS spectrum is calculated.

When Yes is judged in Step S35, whether a process for all the combinations of the MS/MS spectra is completed is judged (Step S37). When the process is not completed, the process is returned to Step S31, a different combination of the MS/MS spectra is selected, and the aforementioned process is repeated. Therefore, the processes of Steps S31 to S37 are repeated. Thus, the similarity between all the combinations of the predetermined number of MS/MS spectra and the actually measured MS/MS spectrum is calculated. A combination of MS/MS spectra and a coefficient that can finally achieve the highest similarity, and the similarity are extracted, and displayed on the display unit 4 as identification results (Step S38). The predetermined number of results may be displayed in an order of decreasing similarity.

When as the number of combinations of MS/MS spectra, a value N that is three or more is specified, combinations of not only N MS/MS spectra but also less than N MS/MS spectra may be an object of calculation for similarity.

In addition to the MS/MS spectra of the known compounds, the spectrum library 26 may include an MS/MS spectrum obtained during selecting as a precursor ion an ion in which an adduct ion is added to a multimer of matrix or a compound obtained by removing a specific neutral molecule from the multimer of matrix, and the MS/MS spectrum of the mixture used in the first modification. Further, the spectrum library 26 may include an MS/MS spectrum obtained from the same compound under a different condition of irradiation with a laser beam from an MALDI ion source (laser beam energy, irradiation time, etc.), or a different condition (collision energy, collision gas pressure, etc.) during dissociation of ions due to collision-induced dissociation.

[Third Modification of Identification Process]

Figure 8:
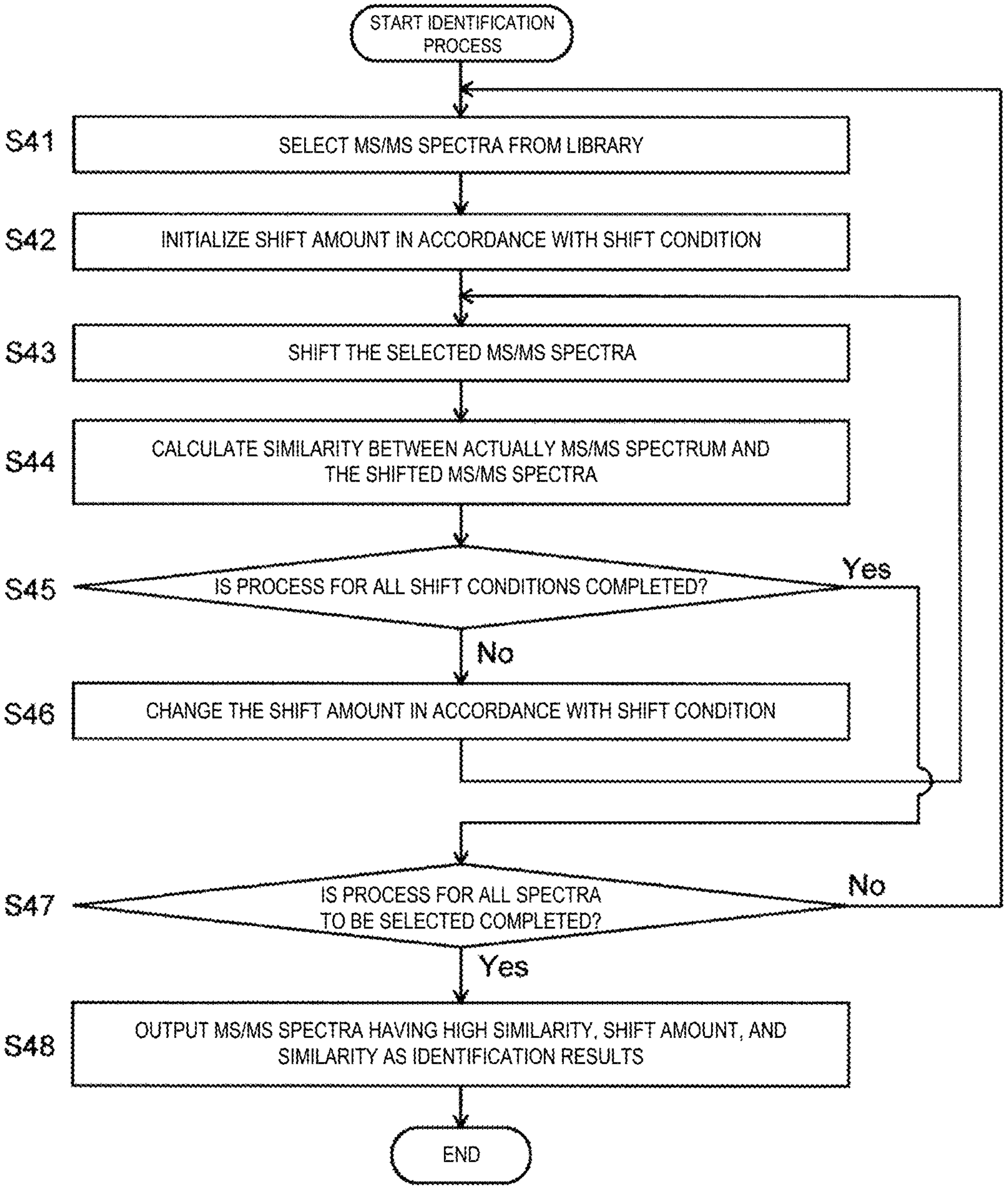
FIG. 8 is a flowchart showing yet another example of identification process by library search in the imaging mass spectrometer of the embodiment.
Figure 9A:
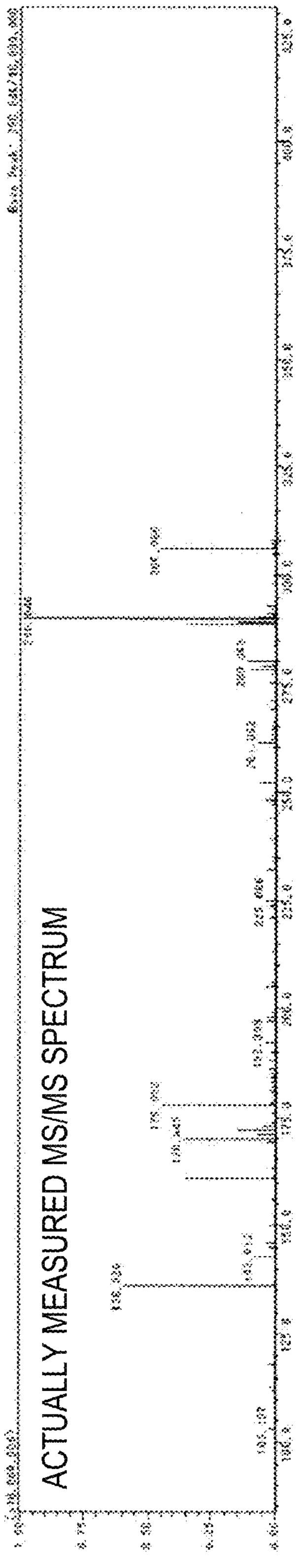
FIG. 9A is an actually measured MS/MS spectrum when both an ion derived from a multimer of DHB and an ion derived from a reduced glutathione are precursor ions.
Figure 9B:
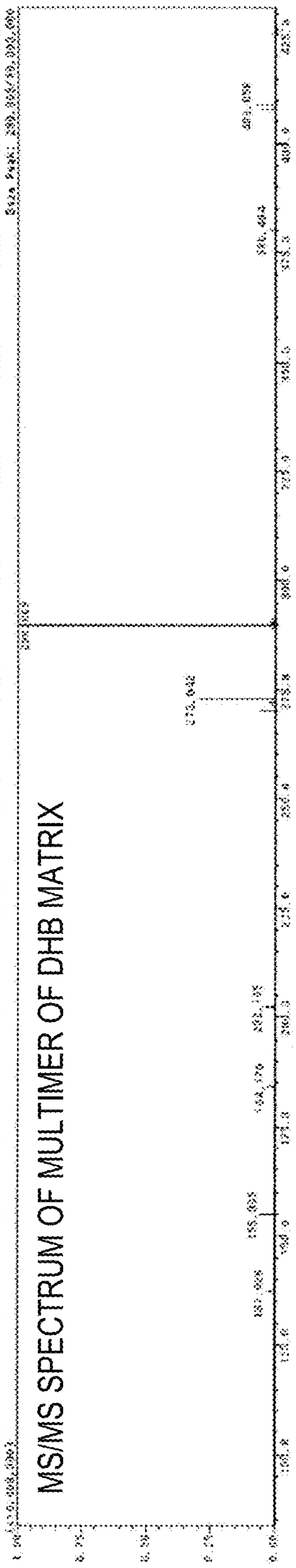
FIG. 9B is a standard MS/MS spectrum of the multimer of DHB.
Figure 9C:
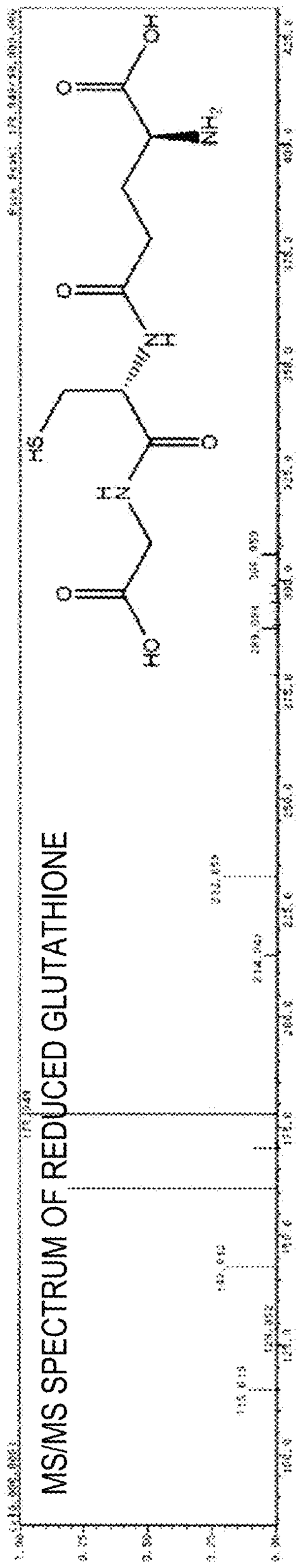
FIG. 9C is a standard MS/MS spectrum of the reduced glutathione.

FIG. 8 is a flowchart of distinctive process that is executed by the identification processing unit 25 in a third modification.

During ionization of a compound by an MALDI ion source, a proton is often added to or detached from the compound to achieve ionization. However, depending on a condition, an ion of alkali metal such as Na and K may be added, resulting in ionization. When such an adduct ion is selected as a precursor ion during MS/MS analysis, the alkali metal ion added to the precursor ion may be added to a structure in which a specific linkage part of ion is dissociated and fragmented due to collision-induced dissociation, and observed as a peak on an MS/MS spectrum. In the third modification, in consideration of a mass-to-charge ratio difference corresponding to this adduct ion, library search is performed.

The MS/MS spectrum stored in the spectrum library 26 is generally an MS/MS spectrum in which a peak of proton-added ion of a pure compound as a standard sample is selected as a precursor ion. During actual measurement for a sample, a peak of proton-added ion of the target compound may overlapped with a peak derived from another compound. At that time, the peak of the adduct ion is selected as a precursor ion and MS/MS analysis is performed. In such a case, the actually measured MS/MS spectrum is close to MS/MS spectra obtained by shifting the MS/MS spectra stored in the spectrum library 26 parallel to the horizontal axis by a difference in mass between H and Na.

When the actually measured MS/MS spectrum is given, the identification processing unit 25 selects an MS/MS spectrum from the spectrum library 26, and shifts each peak on the MS/MS spectrum in a direction of increasing or decreasing the m/z value by an initially set value of shift amount in accordance with a shift condition specified by the user (Steps S42 and S43). The shift condition, that is, the shift amount range and the step width that changes the shift amount may be specified in advance by the user. In this case, the initially set value of shift amount can be automatically determined. The similarity between the shifted MS/MS spectrum and the actually measured MS/MS spectrum is calculated (Step S44). Whether a process in accordance with the specified shift condition is completed is judged (Step S54). When the process is not completed, the shift amount is changed (Step S46), and the process is returned to Step S43. The processes of Steps S43 to S46 are repeated. Thus, the similarity between the MS/MS spectra obtained by shifting the selected MS/MS spectra by various shift amounts, and the actually measured MS/MS spectrum is calculated.

When Yes is judged in Step S45, whether a process for all the MS/MS spectra is completed is judged (Step S47). When the process is not completed, the process is returned to Step S41, a different MS/MS spectrum is selected, and the aforementioned process is repeated. Therefore, the processes of Steps S41 to S47 are repeated to calculate the similarity between all the MS/MS spectra and the actually measured MS/MS spectrum. An MS/MS spectrum and a shift amount that can finally achieve the highest similarity, and the similarity are extracted, and displayed on the display unit 4 as identification results (Step S48). A predetermined number of results may be displayed in an order of decreasing similarity.

When the kind of added ion of the precursor ion can be specified during MS/MS analysis, the user may input information including the kind and amount of the added ion. Based on the input, the identification processing unit 25 may shift the MS/MS spectra stored in the spectrum library 26 by an amount corresponding to the added ion and compare the shifted MS/MS spectra with the actually measured MS/MS spectrum.

Of course, all or only a part of the first to third modifications can be applied to the imaging mass spectrometer of the embodiment.

The identification technique described in each of the first to third modifications can be used in compound identification based on data obtained by not only the imaging mass spectrometer, but also a mass spectrometer capable of general MS/MS analysis, such as a tandem quadrupole mass spectrometer, a Q-TOF mass spectrometer, an ion trap mass spectrometer, and an ion trap time-of-flight mass spectrometer.

The aforementioned embodiment and the aforementioned modifications are a mere example of the present invention, and any appropriate changes, modifications, or additions made within the spirit of the present invention will naturally fall within the scope of claims of the present application. For example, in the aforementioned embodiment, compound identification using the MS/MS spectrum is performed. In compound identification using an $MS^n$ spectrum wherein n is three or more, the present invention can be utilized.

REFERENCE SIGNS LIST

1 . . . Imaging mass spectrometry unit
2 . . . Data processing unit
20 . . . Spectrum data storage unit
21 . . . Reference information creation processing unit
210 . . . Main peak extraction unit
211 . . . Image creation processing unit
212 . . . Image classification unit
213 . . . Reference information display processing unit
22 . . . ROI setting processing unit
23 . . . Average spectrum creation unit
24 . . . Spectrum adder-subtracter
25 . . . Identification processing unit
26 . . . Spectrum library
3 . . . Input unit
4 . . . Display unit

The invention claimed is:

1. An imaging mass spectrometry data processing device for processing $MS^n$ spectrum data obtained by $MS^n$ analysis (n is an integer of two or more) at each of a plurality of measurement points within a predetermined region to be measured on a sample, comprising:

a) an image creation unit for creating a mass spectrometry image illustrating signal intensity distribution at a specific mass-to-charge ratio of the region to be measured or a part of the region to be measured based on the $MS^n$ spectrum data;

b) a region-of-interest setting unit for setting a plurality of small regions as regions of interest on the mass spectrometry image or on an optical image corresponding to the region to be measured, wherein the regions of interest include a plurality of measurement points;

c) an $MS^n$ spectrum acquisition unit for acquiring an average $MS^n$ spectrum of each of the plurality of regions of interest by averaging $MS^n$ spectra of the plurality of measurement points in the each of the plurality of region of interest, or determining a typical $MS^n$ spectrum of each of the plurality of regions of interest among $MS^n$ spectra of the plurality of measurement points in the each of the plurality of region of interest, and acquiring a calculated $MS^n$ spectrum by addition or subtraction of the average $MS^n$ spectra or the typical $MS^n$ spectra at the plurality of regions of interest; and d) a compound identification unit for identifying a compound existing in the plurality of regions of interest based on similarity between the calculated $MS^n$ spectrum and $MS^n$ spectra stored in a spectrum library.

2. The imaging mass spectrometry data processing device according to claim 1, further comprising:

an image display processing unit for displaying the mass spectrometry image or the optical image on a screen of a display unit; and a region-of-interest specifying unit for specifying an optional small region as a region of interest on the displayed mass spectrometry image or optical image by a user, wherein the region-of-interest setting unit sets the small region specified by the region-of-interest specifying unit for the region of interest.

3. The imaging mass spectrometry data processing device according to claim 1, further comprising:

a reference image creation unit for creating a plurality of reference mass spectrometry images illustrating signal intensity distribution at a plurality of main mass-to-charge ratios based on the $MS^n$ spectrum data;

an image classification unit for classifying the plurality of reference mass spectrometry images into one or more groups based on similarity of signal intensity distribution; and a reference image display processing unit for displaying the classified reference mass spectrometry images on a screen of a display unit.

4. The imaging mass spectrometry data processing device according to claim 3, wherein the image classification unit classifies the reference mass spectrometry images into one or more groups using principal component analysis.

5. The imaging mass spectrometry data processing device according to claim 3, wherein the reference image display processing unit displays on the screen of the display unit an image obtained by coloring typical reference mass spectrometry images in a plurality of classified groups with different colors and overlapping the images, and causes the region-of-interest setting unit to set a region of interest based on the image.

6. The imaging mass spectrometry data processing device according to claim 1, wherein the compound identification unit refers to a library including the $MS^n$ spectra of known compounds, and performs compound identification, the compound identification unit stores an $MS^n$ spectrum of a mixture containing one or more compounds to be mixed with the known compounds in the library with a mixing condition for the mixture, and when a part of analysis conditions during acquiring $MS^n$ spectrum data to be processed is consistent with the mixing condition, the $MS^n$ spectrum in the library corresponding to the mixing condition is subtracted from an actually measured $MS^n$ spectrum and library search is performed.

7. The imaging mass spectrometry data processing device according to claim 1, wherein the compound identification unit refers to the library including the $MS^n$ spectra of known compounds, and performs compound identification, and the compound identification unit performs compound identification based on similarity between an $MS^n$ spectrum obtained by combining the plurality of $MS^n$ spectra stored in the library and the actually measured $MS^n$ spectrum.

8. The imaging mass spectrometry data processing device according to claim 1, wherein the compound identification unit refers to the library including the $MS^n$ spectra of known compounds, and performs compound identification, and the compound identification unit performs compound identification based on similarity between an $MS^n$ spectrum obtained by shifting each peak on the $MS^n$ spectra stored in the library upwardly or downwardly by a predetermined mass-to-charge ratio and the actually measured $MS^n$ spectrum.

9. An imaging mass spectrometry data processing method for processing $MS^n$ spectrum data obtained by $MS^n$ analysis (n is an integer of two or more) at each of a plurality of measurement points within a predetermined region to be measured on a sample, comprising:

an image creation step of creating a mass spectrometry image illustrating signal intensity distribution at a specific mass-to-charge ratio of the region to be measured or a part of the region to be measured based on the $MS^n$ spectrum data;

a region-of-interest setting step of setting a plurality of small regions as a plurality of regions of interest on the mass spectrometry image or an optical image corresponding to the region to be measured, wherein the regions of interest include a plurality of measurement points;

an $MS^n$ spectrum acquisition step of acquiring an average $MS^n$ spectrum of each of the plurality of regions of interest by averaging $MS^n$ spectra of the plurality of measurement points in the each of the plurality of region of interest, or determining a typical $MS^n$ spectrum of each of the plurality of regions of interest among $MS^n$ spectra of the plurality of measurement points in the each of the plurality of region of interest, and acquiring a calculated $MS^n$ spectrum obtained by addition or subtraction of the average $MS^n$ spectra or the typical $MS^n$ spectra at the plurality of regions of interest; and a compound identification step of identifying a compound existing in the plurality of regions of interest using the calculated $MS^n$ spectrum.

10. The imaging mass spectrometry data processing device according to claim 4, wherein the reference image display processing unit displays on the screen of the display unit an image obtained by coloring typical reference mass spectrometry images in a plurality of classified groups with different colors and overlapping the images, and causes the region-of-interest setting unit to set a region of interest based on the image.

* * * * *